United States Patent Office 2,827,479
Patented Mar. 18, 1958

2,827,479
NITROPROPANEDIOL DICARBAMATES

Edward B. Hodge, Terre Haute, Ind., assignor to Commercial Solvents Corporation, Terre Haute, Ind., a corporation of Maryland No Drawing. Application January 7, 1957
Serial No. 632,668

6 Claims. (Cl. 260—482)

My invention relates to nitropropanediol dicarbamates and more particularly to dicarbamates having the following structural formula:

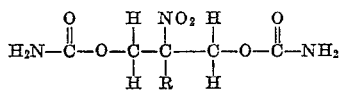

where R is alkyl or hydrogen. I have found that the compounds of my invention are easily prepared by the reaction of phosgene with a nitrodiol having the following formula:

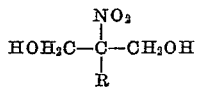

where R is alkyl or hydrogen, and ammoniating the product to form the nitropropanediol dicarbamate. Among the compounds which come within the scope of my invention are: 2-nitro-2-methyl-1,3-propanediol dicarbamate, 2-nitro-2-ethyl-1,3-propanediol dicarbamate, 2-nitro-2-n-propyl-1,3-propanediol dicarbamate, 2-nitro-2-isopropyl-1,3-propanediol dicarbamate, 2-nitro-1,3-propanediol dicarbamate, etc. Among the nitrodiols which may be utilized in preparing the compounds of my invention are: 2-nitro-2-methyl-1,3-propanediol, 2-nitro-2-methyl-1,3-propanediol, 2-nitro-2-propyl-1,3-propanediol, 2-nitro-2-isopropyl-1,3-propanediol, etc.

I have found the nitropropanediol dicarbamates of my invention to be useful as curing agents for epoxy resins, plasticizers for butadiene acrylonitrile rubber, and resin intermediates. I have also found my new compounds to have physiological activity. The following examples serve to illustrate my invention, but it is not intended that my invention to be limited to the compounds listed in the specific examples herein set forth.

Example I

Into 200 mls. of toluene was passed 20 grams of phosgene at 15° C. To the phosgene solution maintained in a sealed system, a mixture of 16.2 grams of 2-nitro-2-propyl-1,3-propanediol and 38 grams of antipyrene dissolved in a minimum amount of chloroform at —10° C. was added. The mixture was allowed to warm to room temperature and stirred for two hours. The reaction mixture was allowed to stand overnight and then saturated with anhydrous ammonia. The solid formed during ammoniation was removed by filtration, dried, and extracted with cold water, and then recrystallized from hot water. The white crystalline 2-nitro-2-propyl-1,3-propanediol dicarbamate was found to have a melting point of 145–147° C.

Example II

To 600 mls. of toluene, 74 grams of phosgene were added at 15° C. In a sealed system maintained at —10 to —15° C., a solution of 114 grams of antipyrene and 40.5 grams of 2-nitro-2-methyl-1,3-propanediol dissolved in a minimum amount of chloroform was added to the phosgene solution. The mixture was stirred for 1 hour and left overnight. Then 50 mls. of ammonia were added at 25° C. The reaction mixture was then stirred for 30 minutes, filtered, and the precipitate was washed with 200 ml. of water, then crystallized from 400 ml. of water to yield 42.2 grams of crude 2-nitro-2-methyl-1,3-propanediol dicarbamate having a melting point of 160–170° C.

Example III

Using the procedure of Example II, 44.7 grams of 2-nitro-2-ethyl-1,3-propanediol was reacted with phosgene and ammonia to form 41 grams of 2-nitro-2-ethyl-1,3-propanediol dicarbamate having a melting point of 151–152° C.

Example IV

Using the procedure of Example II, 2-nitro-2-isopropyl-1,3-propanediol dicarbamate and 2-nitro-1,3-propanediol dicarbamate were prepared.

Now having described my invention, what I claim is:

1. A compound having the following structural formula:

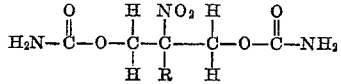

where R is selected from the group consisting of hydrogen and alkyl.

2. 2-nitro-2-methyl-1,3-propanediol dicarbamate.
3. 2-nitro-2-ethyl-1,3-propanediol dicarbamate.
4. 2-nitro-2-propyl-1,3-propanediol dicarbamate.
5. 2-nitro-2-isopropyl-1,3-propanediol dicarbamate.
6. 2-nitro-1,3-propanediol dicarbamate.

No references cited.

U. S. DEPARTMENT OF COMMERCE
PATENT OFFICE

CERTIFICATE OF CORRECTION

Patent No. 2,827,479     Edward B. Hodge     March 18, 1958

It is hereby certified that error appears in the printed specification of the above numbered patent requiring correction and that the said Letters Patent should read as corrected below.

Column 1, line 41, for "methyl-" read -- ethyl- --.

Signed and sealed this 3rd day of June 1958.

(SEAL)
Attest:

KARL H. AXLINE
Attesting Officer

ROBERT C. WATSON
                                         Commissioner of Patents